United States Patent [19]
Lowery, Sr.

[11] 3,993,448
[45] Nov. 23, 1976

[54] SCRUBBER AND COMBUSTION APPARATUS

[76] Inventor: Leroy Lowery, Sr., 610 Second St., Braddock, Pa. 15104

[22] Filed: Apr. 29, 1975

[21] Appl. No.: 572,734

[52] U.S. Cl. .............................. 23/262; 55/227; 55/257 C; 261/DIG. 9; 261/36 R; 261/116; 23/277 C
[51] Int. Cl.² .......................................... B01J 6/00
[58] Field of Search ................... 55/85, 89, 93–95, 55/223, 228, 240, 241, 242, 244, 260, 257 C; 261/115–118, DIG. 9, 36 R; 23/277 C, 262

[56] References Cited
UNITED STATES PATENTS

| | | | |
|---|---|---|---|
| 1,049,796 | 1/1913 | Anderson | 55/228 |
| 1,620,826 | 3/1927 | Mitchell | 261/DIG. 9 |
| 2,484,277 | 10/1949 | Fisher | 55/223 |
| 2,767,806 | 10/1956 | Blake | 55/223 |
| 3,175,340 | 3/1965 | Schulze | 55/89 |
| 3,353,336 | 11/1967 | Caballero | 55/228 |
| 3,775,948 | 12/1973 | Beam | 55/238 |
| 3,856,487 | 12/1974 | Perez | 55/223 |

Primary Examiner—Bernard Nozick
Attorney, Agent, or Firm—Donn J. Smith

[57] ABSTRACT

A pollution control unit comprises a tank having an outlet and an inlet for gases treated therein. A pair of spray compartments are spacedly situated within the tank, and a de-entrainment compartment is situated between the spray compartments. A series of spaced baffles define the spray and de-entrainment compartments and in addition define the flow path of the gases serially through the compartments. Spray devices are provided for directing water sprays into the gases but only within the spray compartments. Additional spray and de-entrainment compartments are contemplated.

5 Claims, 3 Drawing Figures

U.S. Patent    Nov. 23, 1976    3,993,448
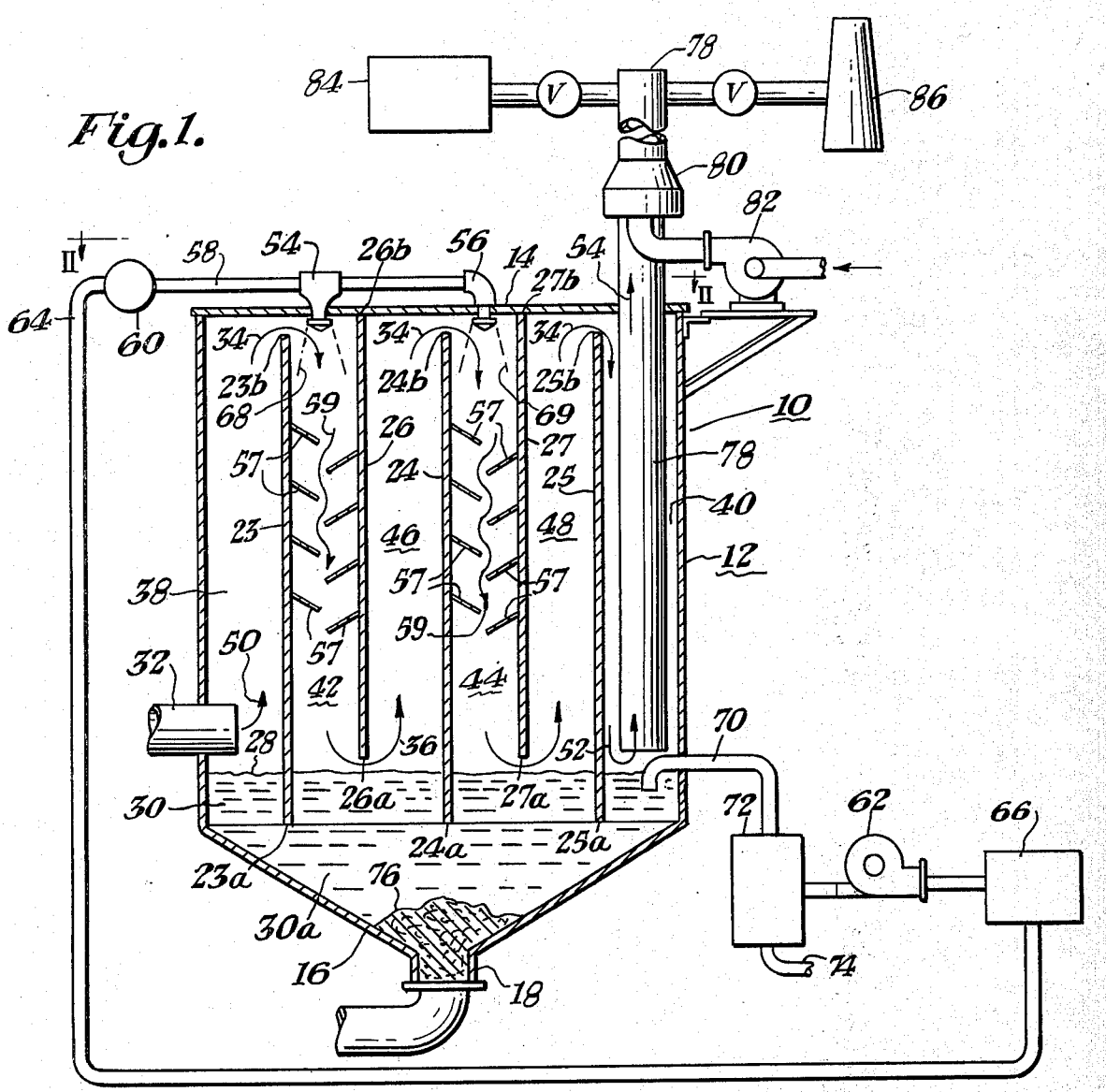
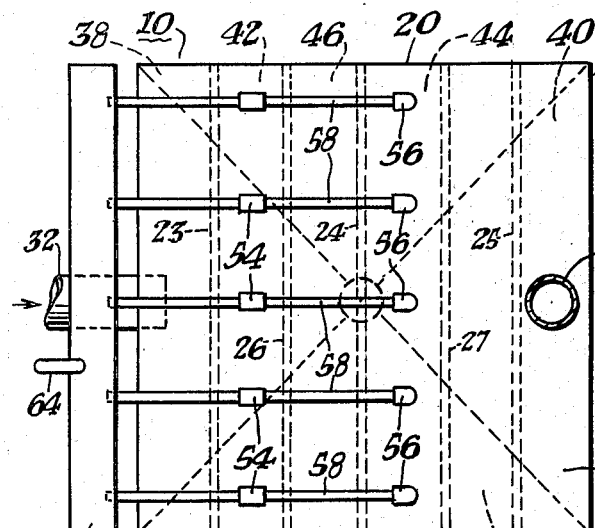
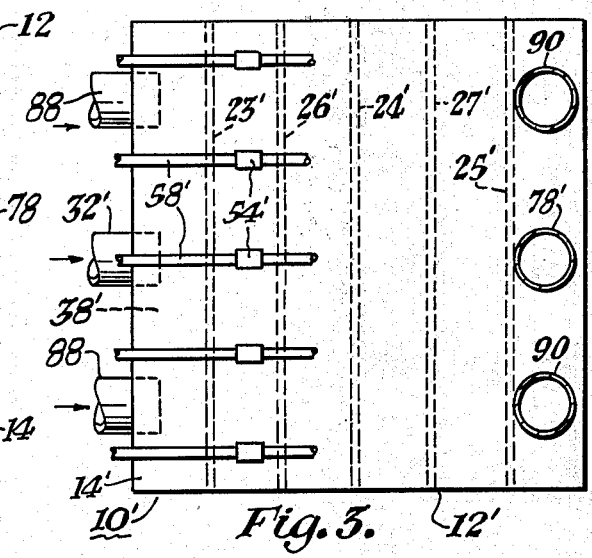

SCRUBBER AND COMBUSTION APPARATUS

The present invention relates to pollution control equipment and more particularly to a separator for flyash and other contaminants produced by various types of industrial furnaces.

In the past, numerous arrangements have been disclosed for controlling the accumulation of flyash and other particulate matter, together with water soluble gases such as $SO_2$, $H_2S$ and the nitrous oxides. For the most part prior arrangements utilized various forms of steam and water sprays for removal of contaminants. The use of steam scrubbers resulted in a large amount of moisture entrainment in the flue gases and necessitated the use of considerable make-up water where the system was enclosed. At the same time the efficiency of the system for removal of particulate matter was markedly reduced. Little or none of the water soluble contaminants was removed owing to the relatively high steam temperature.

In prior equipment utilizing water sprays, the latter frequently were applied in such manner as to increase rather than reduce the pressure drop associated with passage of the flue gases or the like through the equipment. Frequently the flue gases or other contaminated gases were passed through the system without intimate contact with the spray water such that only a relatively small part of the particulate matter and other contaminants was removed. In other cases the path of the contaminated gases through the equipment was not directed for optimum removal of entrained water droplets in the most efficacious manner. In prior equipment having a sludge chamber of sump, agitation was frequently accomplished either by recirculating pumps or by bubbling the gases through the sump in an attempt to upgrade the separating efficiency of the equipment. However, there was no opportunity for settling of very fine particulate matter removed from the contaminated gases. As a result, the filters, if used, became clogged, or the sludge was also recirculated whenever it was desired to recirculate the sump water to the spray equipment. It should also be pointed out that bubbling of the contaminated gases through the sump liquid deleteriously increased the water entrainment and pressure drop of the gases being treated.

Accordingly I provide an improved control unit, for gases containing soluble (for examples $SO_2$ and $H_2S$) and particulate contaminants, wherein the gases being cleaned assume a tortuous path calculated to minimize water entrainment and to maximize the separatory function of the control unit. The path through my novel decontaminating equipment is arranged for minimal pressure drop. A series of water sprays impose a scrubbing and dissolving action upon the various contaminats contained within the gases being treated. The water sprays, however, are directed in such manner as to expedite the flow of gases through the equipment, rather than in opposition thereto, in diminution of pressure drop. The gases being treated, under impetus of the spray equipment are directed toward a quiescent sump at two or more generally parallel locations for maximum removal of both particulate and soluble contaminants.

On the other hand agitation of the sump is avoided insofar as possible for minimal interference with settling of the removed particulate matter or sludge. Thus the particulate matter settles within the quiescent sump while relatively clean water can be decanted from the top of the sump for recirculation to the water spray system.

I attain the aforementioned desirable results by providing a pollution control unit comprising a tank having an inlet and an outlet for gases treated therein, a pair of spray compartments spacedly situated within said tank, a de-entrainment compartment situated between said spray compartment, a series of spaced baffles defining said spray and said de-entrainment compartments, said baffles in addition defining the flow path of said gases in seriatim through said compartments, and spray devices for directing water sprays into said gases within said spray compartments only.

I also desirably provide similar pollution control equipment wherein said gases and said water sprays are both directed downwardly within said spray compartments, and said gases are directed upwardly within said de-entrainment compartment.

I also desirably provide similar pollution control equipment wherein some of said baffles terminate beneath the surface of a liquid contained in said sump but short of the bottom of said tank to aid in defining said path but to maintain the common character of said sump.

I also desirably provide similar pollution control equipment wherein some of said baffles terminate short of a liquid sump in the bottom of said tank and the remainder of said baffles terminate short of a top of said tank to provide said serpentine path and the short terminations of said baffles are spaced sufficiently close to said tank top and to said sump level respectively for centrifugal de-entrainment of said gases when passing around said baffle edges.

I also desirably provide similar pollution control equipment including a common sump in a bottom portion of said tank and disposed in communication with each of said compartments, an overflow pipe extended through a wall of said tank to define a liquid level of said sump and means for recirculating overflow water from said sump to said spray means.

The following U.S. Patents are representative of the prior art known to applicant at the present time:
Blake No. 2,767,806
Davis No. 2,899,012
Price No. 3,239,999
Ruiz No. 3,766,716

The foregoing references, either singly or in combination, do not disclose any of the novel features of the invention pointed out above and elsewhere in this application.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein:

FIG. 1 is a vertically sectioned view of one form of pollution control equipment arranged in accordance with my invention; and, FIG. 2 is a top plan view of the equipment shown in FIG. 1.

FIG. 3 is a top plan view of another modification of the invention.

With more particular reference now to the drawings, the pollution control equipment 10 shown therein comprises a tank 12 having a top plate or cover 14 and an inverted pyramidal bottom 16 terminating in a clean out 18. As better shown in FIG. 2 the tank 12 can be of square or rectangular configuration as required.

Extending between opposite sides 20, 22 (FIG. 2) of the tank 12 are a number of baffle plates 23, 24, 25, 26 and 27. The baffles 23, 24, 25 are positioned so that their lower end portions 23a, 24a, 25a extend beneath liquid level 28 of a sediment sump 30 normally contained within and adjacent the bottom 16 of the tank 12. Upper ends 23b, 24b, 25b of the baffles 23, 24, 25 are spaced from the plate or cover 14 of the tank 12 to afford passage of the gases being treated and entering the tank 12 through inlet conduit 32. On the other hand the baffles 26, 27 are positioned such that their lower edges 26a, 27a are spaced from the sump level 28 to afford passage for the gases being treated. The upper edges 26b, 27b of the baffles 26, 27 are arranged for flush engagement with the cover plate 14 to prevent passage of gases therebetween. Accordingly the treated gases flowing through the tank 12 assume a tortuous or serpentine path around the upper ends 23b, 24b, 25b of the baffles 23-25 and around the lower ends 26a, 27a of the baffles 26, 27 as denoted by flow arrows 34, 36 respectively. It will be understood that additional baffles similar to the baffles 24, 26 can be utilized, depending upon the extent of treatment required for given contaminated gases supplied to the tank 12 through the inlet conduit 32.

The baffles 23-27 subdivide the interior of the tank 12 (excluding the lower portion 30a of the sump) into a gas intake compartment 38, gas outlet compartment 40, spray compartments 42, 44, and de-entrainment compartments 46, 48. As evident from FIG. 1 the incoming gas to be treated is conducted successively through the aforementioned compartments as denoted by flow arrows 34, 36, 50, 52, 54. Each of the compartments 38-48 communicate directly with the common sump 30, as evident from FIG. 1. The various functions of the individual tank compartments, 38-48, will be described presently.

For each of the spray compartments 42 or 44 a row or other suitable array of spray nozzles 54 or 56 is provided, as better shown in FIG. 2. The spray nozzles 54 and 56 are coupled through branch conduits 58 to an intake header 60, which in turn is connected to recirculating pump 62 (FIG. 1) through conduit 64 for recirculating sump water 30. If desired a water air cooler 66 or the like can be coupled in conduit 64 for cooling the recirculated spray water. Alternatively spray water can be supplied directly from an external source (not shown).

In each spray compartment 42 or 44 a number of deflector plates 57 are secured to adjacent wall surfaces of the associated baffles 23, 26 or 24, 27. The deflector plates are inclined downwardly to facilitate downward flow of the gases being treated and to pevent accumulation of sludge on the deflector plates. The deflector plates cause the gases and the water spray to assume a gently serpentine path as denoted by arrows 59 through the spray compartments 42, 44 in order to ensure an intimate contact between the gases and the spray water for removal of particulate matter and maximum solvent action.

As evident from FIG. 1 the water sprays 68, 69 applied to the spray compartments 42, 44 accumulate in the sump 30, the liquid level 28 of which is controlled by overflow pipe 70. Desirably the overflowed sump liquid is collected in an accumulator tank 72 or the like, which is in turn coupled to the intake of the circulating pump 62. Make-up water as required can be supplied through conduit 74 to the accumulator tank 72 from a suitable source (not shown).

The quiescent condition of the sump 30 is largely preserved by the lower end portions 23a, 24a, 25a of the baffles 23-25 which extend as aforesaid beneath the surface of the sump 30 and which prevent direct flow of spray water from the spray compartments 42, 44 to the overflow conduit 70. In consequence the sediment removed from the gases being treated by the water sprays 68 settles rapidly to the bottom 16 of the tank 12 adjacent the clean out 18 as denoted by reference numeral 76.

In the outlet compartment 40 of the tank 12 the treated gases enter outlet conduit 78, which desirably extends adjacent the bottom of the compartment 40 or the sump level 28 to afford a chimney effect to the treated gases leaving the tank 12 through the conduit 78. Over the top of the tank 12 the conduit 78 is provided with a bonnet 80 into which make-up air can be blown by blower 82. Introduction of make-up air in this fashion also facilitates movement of the treated gases through the tank 12 and conduit 78, from which the gases can be recirculated to a furnace 84 or the like for more complete combustion or to a chimney or stack 86 as required. In this manner the control unit 10 can be sealed for extended periods, as during temperature inversions and the like.

In operation, contaminated gases containing flyash or other particulate matter and/or soluble contaminants are inducted into the tank 12 through inlet conduit 32. Expanding into and flowing upwardly through the entry compartment 38 the heavier of the suspended particules separate and settle into the sump 30. The separation is facilitated by the lateral deflection of the gases (arrow 50) upon leaving the intake pipe 32 and also by a similar deflection along the top edge 23b of the adjacent baffle 23.

As the gases pass around the upper baffle edge 23b, the first row of water sprays 68 are encountered. The cooling effect of the water sprays 68 and their downward flow movement expedite movement of the gases along their serpentine path through the tank 12. The gently serpentine path 59 of the gases within each of the spray compartments 42, 44 while ensuring intimate mixture of gases and water spray, does not significantly detract from the positive pressure drops applied to the gases in the spray compartments 42, 44. The intimate mixture of spray water and gases largely removes the particulate and soluble contaminants in the compartment 42. At the bottom of the first spray compartment 42 the gases make an abrupt turn (arrow 36) around the lower edge 26a of the baffle 26. This abrupt turn facilitates centrifugal de-entrainment of the spray water together with the contaminants contained therein. The gases then pass upwardly through the first de-entrainment compartment 46 wherein expansion of the gases after passing under the baffle 26 causes further de-entrainment. At the top of the first de-entrainment chamber 46 de-entrainment of spray water is virtually completed as the gases make an abrupt turn around the upper edge 24b of the baffle 24.

At this point in the serpentine path through the tank 12 the gases enter the second spray compartment 44 and immediately contact the water sprays 69. Any remaining particulate or soluble contaminants are substantially removed in the second spray compartment 44, followed by centrifugal de-entrainment at the ensuing lower and upper baffle edges 27a and 25b together with expansional de-entrainment within the tank compartment 48, as described above in connection with the de-entrainment compartment 46 and the baffle edges 26a, 24b.

Further de-entrainment occurs within the delivery compartment 40 as the gases expand thereinto after passage around the upper baffle edge 25b. Near the bottom of the delivery compartment 40 the gases are again and abruptly turned into the lower end of the outlet conduit 78, with the result that further centrifugal de-entrainment results.

The upper edges 23b, 24b, 25b of the baffles 23–25 are sufficiently closely spaced with respect to the cover plate 14 of the tank 12 so that the velocity of the gases is increased for adequate de-entrainment along the baffle edges 24b, 25b and for removal of the heavier particulate matter at the baffle edge 23b. However, the baffle edges 23b–25 are sufficiently spaced from the cover plate 14 to avoid significant increases in pressure drop.

Similarly the lower edges 26a, 27a and the lower end of the outlet conduit 78 are relatively closely spaced with respect to the liquid level 28 of the sump 30. In addition the abrupt changes in direction of the gases at these baffle and conduit edges causes the entrained water droplets to impinge directly on the surface of the sump liquid and further to facilitate their removal from the gases.

Similar polution control equipment is shown in FIG. 3 of the drawings, where reference numerals with primed accents identify components similar to corresponding components of the preceding figures. In the pollution control equipment 10' additional inlet conduits 88 and outlet conduits 90 are provided. The additional inlet conduits 88 together with the conduit 32' are coupled to the inlet compartment 38' after the manner described in connection with the inlet conduit 32 and inlet compartment 38 of the preceding figures. Similarly the additional outlet conduits 90 are coupled to the outlet compartment 40 after the manner of the outlet conduit 78 of FIGS. 1 and 2 and the outlet conduit 78' of FIG. 3. Each of the additional outlet conduits 90 can be provided with a bonnet and blower (not shown in FIG. 3) after the manner of the bonnet 80 and blower 82 of FIG. 1.

Alternatively, the three outlet conduits 78', 90, 90 can be coupled to a larger exhaust conduit (not shown) similarly provided with a bonnet and blower, as required. Thus, the outlet conduit 78', 90, 90 can be coupled to one or a number of stacks and/or furnaces respectively, as desired. In like manner the inlet conduits 32', 88, 88 can be coupled to a single furnace or to separate furnaces respectively.

It will be understood that a different number of inlet and outlet conduits from that shown in FIG. 3 can be employed. In any event the throughput of the pollution control equipment 10' is significantly increased by use of one or more additional input and output conduits 88, 90. Where necessary, the pressure drop of the equipment 10' can be reduced by further displacing the respective edges of the baffles 23'–27' from the cover plate 14' of the tank 12' or from the water level therein as the case may be.

From the foregoing it will be seen that a novel and efficient control unit for flyash and other contaminants has been described. The description and illustrative materials employed herein are utilized for purposes of exemplifying the invention and not in limitation thereof. Accordingly, numerous modifications of the invention will occur to those skilled in the art without departing from the spirit and scope of the invention. It is to be understood, moreover that certain features of the invention can be used to advantage without a corresponding use of other features thereof.

I claim:

1. A pollution control unit for treating contaminated gases, said unit comprising a tank having inlet and outlet compartments therein extending transversely of a serpentine flow path of said gases thru said tank, a plurality of spray and deentrainment compartments positioned in an alternating array between said inlet and said outlet compartments and likewise extending transversely of said gas flow, a series of spaced baffles defining said compartments, said baffles in addition defining said serpentine flow path of said gases in seriatim thru said compartments, said tank having a common sump communicating with lower end portions of each of said compartments, alternate ones of said baffles terminating beneath the surface of a liquid contained in said sump but short of a bottom of said tank in maintenance of a common character of said sump, said alternate baffles and the remainder of said baffles terminating respectively short of a top of said tank and short of said liquid surface in provision of said serpentine path, said remainder baffles sealingly engaging said tank top, arrays of spray devices mounted on said tank top and communicating respectively with top portions of said spray compartments, each of said arrays likewise extending transversely of said fluid flow and substantially co-extending with the length of said spray compartments, said spray devices being disposed for directing water sprays downwardly into said gases and within said spray compartments only, the short terminations of said baffles being spaced sufficiently close to said tank top and to said liquid surface respectively for centrifugal deentrainment of said gases when passing around the associated baffle edges, said baffles and said compartments being elongated in the transverse direction of said fluid flow in provision of elongated flow slots between adjacent free edges of said baffles on the one hand and the tank top and the liquid surface respectively on the other hand for high volumetric flows through said tank, and conduit means coupling said outlet compartment to an exhaust stack and a combustion device, whereby the treated gases can be exhausted thru either or both of said stack and said device.

2. The combination according to claim 1 including an overflow pipe extended through a wall of said tank and positioned to define the liquid level of said sump, and means for circulating overflow water from said overflow pipe to said arrays of spray devices.

3. The combination according to claim 2 wherein said some baffles terminate sufficiently below said liquid surface to maintain a quiescent character of said sump to facilitate settling of pollutants cleansed from said gases.

4. A pollution control unit for treating contaminated gases, said unit comprising a tank having inlet and outlet compartments therein extending transversely of a serpentine flow path of said gases thru said tank, a plurality of spray and deentrainment compartments positioned in an alternating array between said inlet and said outlet compartments and likewise extending transversely of said gas flow, a series of spaced baffles defining said compartments, said baffles in addition defining said serpentine flow path of said gases in seriatim thru said compartments, said tank having a common sump communicating with lower end portions of each of said compartments, alternate ones of said baffles terminating beneath the surface of a liquid contained in said sump but short of a bottom of said tank in maintenance of a common character of said sump, said alternate baffles and the remainder of said baffles terminating respectively short of a top of said tank and short of said liquid surface in provision of said serpentine path, said remainder baffles sealingly engaging said tank top, arrays of spray devices mounted on said tank top and communicating respectively with top portions of said spray compartments, each of said arrays likewise extending transversely of said fluid flow and substantially co-extending with the length of said spray compartments, said spray devices being disposed for directing water sprays downwardly into said gases and within said spray compartments only, the short terminations of said baffles being spaced sufficiently close to said tank top and to said liquid surface respectively for centrifugal deentrainment of said gases when passing around the associated baffle edges, said baffles and said compartments being elongated in the transverse direction of said fluid flow in provision of elongated flow slots between adjacent free edges of said baffles on the one hand and the tank top and the liquid surface respectively on the other hand for high volumetric flows through said tank, groups of multiple inlet conduits and multiple outlet conduits coupled respectively to said inlet and said outlet compartments, said inlet and said outlet conduit groups each extending transversely of said fluid flow, and conduit means coupling at least one of said outlet conduits to a combustion device and to an exhaust stack whereby the treated gases can be exhausted thru either one or both of said stack and said device.

5. A pollution control unit for treating contaminated gases, said unit comprising a tank having inlet and outlet compartments therein extending transversely of a serpentine flow path of said gases thru said tank, a plurality of spray and deentrainment compartments positioned in an alternating array between said inlet and said outlet compartments and likewise extending transversely of said gas flow, a series of spaced baffles defining said compartments, said baffles in addition defining said serpentine flow path of said gases in seriatim thru said compartments, said tank having a common sump communicating with lower end portions of each of said compartments, alternate ones of said baffles terminating beneath the surface of a liquid contained in said sump but short of a bottom of said tank in maintenance of a common character of said sump, said alternate baffles and the remainder of said baffles terminating respectively short of a top of said tank and short of said liquid surface in provision of said serpentine path, said remainder baffles sealingly engaging said tank top, and arrays of spray devices mounted on said tank top and communicating respectively with top portions of said spray compartments, each of said arrays likewise extending transversely of said fluid flow and substantially co-extending with the length of said spray compartments, said spray devices being disposed for directing water sprays downwardly into said gases and within said spray compartments only, the short terminations of said baffles being spaced sufficiently close to said tank top and to said liquid surface respectively for centrifugal deentrainment of said gases when passing around the associated baffle edges, said baffles and said compartments being elongated in the transverse direction of said fluid flow in provision of elongated flow slots between adjacent free edges of said baffles on the one hand and the tank top and the liquid surface respectively on the other hand for high volumetric flows through said tank, said outlet compartment being coupled to at least one combustion device for recirculating at least a portion of the gases passing thru said unit to said combustion device.

* * * * *